(12) United States Patent
Larsen et al.

(10) Patent No.: US 9,641,113 B2
(45) Date of Patent: May 2, 2017

(54) SYSTEM AND METHOD FOR CONTROLLING A POWER GENERATION SYSTEM BASED ON PLL ERRORS

(71) Applicant: General Electric Company, Schenectady, NY (US)

(72) Inventors: Einar Vaughn Larsen, Charlton, NY (US); Wei Ren, Niskayuna, NY (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 14/193,755

(22) Filed: Feb. 28, 2014

(65) Prior Publication Data

US 2015/0249412 A1 Sep. 3, 2015

(51) Int. Cl.
*G05F 5/00* (2006.01)
*H02P 9/00* (2006.01)
(Continued)

(52) U.S. Cl.
CPC .............. *H02P 9/007* (2013.01); *F03D 7/00* (2013.01); *F03D 7/0284* (2013.01); *F03D 9/003* (2013.01);
(Continued)

(58) Field of Classification Search
CPC .... H02M 1/32; H02M 1/36; H02M 2001/325; H02M 7/44; H02M 7/48; H02M 7/4807; H02M 5/42; H02M 2001/0025; H02M 5/00; H02M 5/40; H02M 5/45; H02M 5/4505; H02M 5/451; H02M 5/452; H02M 5/453; H02M 5/458; H02M 5/4585; H02M 3/22; H02M 3/33; H02M 3/325; H02M 3/335; H02M 3/33515; H02M 3/33523;
(Continued)

(56) References Cited

U.S. PATENT DOCUMENTS

| 4,807,255 A | 2/1989 | Idland | |
|---|---|---|---|
| 5,329,221 A * | 7/1994 | Schauder | G05F 1/70 323/207 |

(Continued)

FOREIGN PATENT DOCUMENTS

| CA | 1247731 A1 | 12/1988 |
|---|---|---|
| CA | 2430778 C | 5/2007 |

(Continued)

OTHER PUBLICATIONS

PCT Search Report and Written Opinion issued in connection with corresponding PCT Application No. PCT/US2015/016740 on May 7, 2015.

*Primary Examiner* — Timothy J Dole
*Assistant Examiner* — Carlos Rivera-Perez
(74) *Attorney, Agent, or Firm* — Dority & Manning, P.A.

(57) ABSTRACT

In one aspect, a method for controlling a power generation system may generally include determining a phase angle error associated with the power generation system, determining a scaling factor based on the phase angle error, generating a current command for controlling the operation of a power convertor of the power generation system and applying the scaling factor to the current command such that the current command is reduced when the phase angle error exceeds a predetermined error threshold.

17 Claims, 6 Drawing Sheets

(51) Int. Cl.
*F03D 7/00* (2006.01)
*F03D 9/00* (2016.01)
*F03D 7/02* (2006.01)
*H02J 3/38* (2006.01)
*H02J 3/44* (2006.01)
*H02M 5/458* (2006.01)
*H02P 23/26* (2016.01)
*H02M 1/00* (2006.01)

(52) U.S. Cl.
CPC ........... *H02J 3/386* (2013.01); *H02J 3/44* (2013.01); *H02M 5/4585* (2013.01); *H02P 23/26* (2016.02); *H02M 2001/0025* (2013.01); *Y02E 10/723* (2013.01); *Y02E 10/725* (2013.01); *Y02E 10/763* (2013.01)

(58) Field of Classification Search
CPC ........ H02M 3/3376; H02J 3/383; H02J 3/386; H02J 3/38; H02J 3/40; H02J 3/44; F03D 7/00; F03D 9/003; F03D 7/0284; H02P 9/007; H03L 7/08; H03L 7/0802; H03L 7/0805; H03L 7/00; H03L 7/06; H03L 7/14; H03L 7/146; H03L 7/148; Y02E 10/70; Y02E 10/723; Y02E 10/725; Y02E 10/76; Y02E 10/763
USPC ... 363/34, 35, 37–47, 50–58, 74, 79, 95–99, 363/131–134, 15–21.03; 323/205–211, 323/222–226, 271–278, 282–286, 299, 323/351, 906, 237, 244, 280, 908; 327/141–163, 237, 243, 244; 307/85–87; 361/18, 78, 79, 85, 86, 88–102; 290/44, 290/52, 55
See application file for complete search history.

(56) References Cited

U.S. PATENT DOCUMENTS

| | | |
|---|---|---|
| 5,502,711 A | 3/1996 | Clark et al. |
| 5,544,202 A | 8/1996 | Jackson et al. |
| 5,663,992 A | 9/1997 | Farmer |
| 5,757,240 A | 5/1998 | Boerstler et al. |
| 5,877,907 A | 3/1999 | Tanishima et al. |
| 5,986,485 A | 11/1999 | O'Sullivan |
| 6,104,251 A | 8/2000 | Ramey et al. |
| 6,121,845 A | 9/2000 | Eribes |
| 6,157,690 A | 12/2000 | Yoneda |
| 6,329,853 B1 | 12/2001 | Iinuma |
| 6,426,680 B1 | 7/2002 | Duncan et al. |
| 6,448,861 B2 | 9/2002 | Kawada et al. |
| 6,577,201 B2 | 6/2003 | Ho et al. |
| 6,687,068 B2 | 2/2004 | Kanai |
| 6,753,737 B2 | 6/2004 | Ho et al. |
| 6,956,416 B2 | 10/2005 | Wilson et al. |
| 6,980,037 B1 | 12/2005 | Page et al. |
| 7,197,099 B2 | 3/2007 | Dosaka |
| 7,330,078 B1 | 2/2008 | Li et al. |
| 7,379,521 B2 | 5/2008 | Dosaka |
| 7,629,705 B2 | 12/2009 | Barker et al. |
| 7,642,861 B2 | 1/2010 | Lewis |
| 7,692,497 B2 | 4/2010 | Hao et al. |
| 7,928,780 B1 | 4/2011 | Yuan et al. |
| 8,014,181 B2 | 9/2011 | Tan et al. |
| 8,046,109 B2 | 10/2011 | Larsen et al. |
| 8,179,111 B2 | 5/2012 | Akyildiz et al. |
| 8,289,057 B2 | 10/2012 | Kawamoto |
| 2001/0009391 A1 | 7/2001 | Kawada et al. |
| 2002/0079976 A1 | 6/2002 | Ho et al. |
| 2002/0141093 A1 | 10/2002 | Kanai |
| 2003/0030497 A1 | 2/2003 | Duncan et al. |
| 2003/0174025 A1 | 9/2003 | Ho et al. |
| 2005/0175135 A1 | 8/2005 | Dosaka |
| 2005/0184772 A1 | 8/2005 | Wilson et al. |
| 2007/0153950 A1 | 7/2007 | Dosaka |
| 2008/0144252 A1 | 6/2008 | Abadeer et al. |
| 2008/0191760 A1 | 8/2008 | Hao et al. |
| 2008/0211560 A1 | 9/2008 | Lam |
| 2009/0256541 A1 | 10/2009 | Akyildiz et al. |
| 2010/0259332 A1 | 10/2010 | Tan |
| 2010/0320763 A1 | 12/2010 | Li et al. |
| 2011/0075456 A1* | 3/2011 | Tan ............ H02M 7/48 363/74 |
| 2011/0080104 A1 | 4/2011 | Gray et al. |
| 2012/0010759 A1* | 1/2012 | Larsen ......... F03D 7/0284 700/292 |
| 2012/0112843 A1 | 5/2012 | Kawamoto |
| 2013/0027993 A1 | 1/2013 | Tan et al. |
| 2013/0120072 A1 | 5/2013 | Murphy et al. |
| 2013/0216014 A1 | 8/2013 | Kong et al. |

FOREIGN PATENT DOCUMENTS

| | | |
|---|---|---|
| CN | 2173586 Y | 8/1994 |
| CN | 1751441 A | 3/2006 |
| CN | 1848682 A | 10/2006 |
| CN | 1892305 A | 1/2007 |
| CN | 101233690 A | 7/2008 |
| CN | 100486115 C | 5/2009 |
| CN | 101860360 A | 10/2010 |
| CN | 102067261 A | 5/2011 |
| CN | 101702523 B | 8/2011 |
| CN | 102571165 A | 7/2012 |
| CN | 102573157 A | 7/2012 |
| CN | 102662243 A | 9/2012 |
| CN | 102681188 A | 9/2012 |
| CN | 102707441 A | 10/2012 |
| CN | 102710957 A | 10/2012 |
| CN | 102710959 A | 10/2012 |
| CN | 102710960 A | 10/2012 |
| CN | 1892305 B | 11/2012 |
| CN | 202551390 U | 11/2012 |
| CN | 103051211 A | 4/2013 |
| DE | 3236071 A1 | 1/1984 |
| EP | 629991 A1 | 5/1994 |
| EP | 629991 B1 | 5/1994 |
| EP | 827283 A2 | 8/1997 |
| EP | 1109318 A1 | 6/2001 |
| EP | 1352476 A2 | 10/2003 |
| EP | 2294596 A1 | 3/2011 |
| EP | 2696462 A2 | 2/2014 |
| GB | 2279190 A | 12/1994 |
| JP | 2092115 A | 3/1991 |
| JP | 3169267 A | 7/1991 |
| JP | 7078422 A | 9/1993 |
| JP | 7226678 A | 2/1994 |
| JP | H10270998 A | 10/1998 |
| JP | H10271003 A | 10/1998 |
| JP | H10285023 A | 10/1998 |
| JP | 2908416 B1 | 6/1999 |
| JP | H11355136 A | 12/1999 |
| JP | 2000115152 A | 4/2000 |
| JP | 3080146 B2 | 8/2000 |
| JP | 2001016100 A | 1/2001 |
| JP | 2001053605 A | 2/2001 |
| JP | 2001060864 A | 3/2001 |
| JP | 2001177400 A | 6/2001 |
| JP | 3193121 B2 | 7/2001 |
| JP | 2002043933 A | 2/2002 |
| JP | 3323153 B2 | 9/2002 |
| JP | 2002271193 A | 9/2002 |
| JP | 2002271213 A | 9/2002 |
| JP | 2003034486 A | 2/2003 |
| JP | 2003296930 A | 10/2003 |
| JP | 2004178787 A | 6/2004 |
| JP | 3560906 B2 | 9/2004 |
| JP | 3609658 B2 | 1/2005 |
| JP | 2006186502 A | 7/2006 |
| JP | 3851511 B2 | 11/2006 |
| JP | 3914531 B2 | 5/2007 |
| JP | 2007150663 A | 6/2007 |
| JP | 2007158472 A | 6/2007 |
| JP | 3976891 B2 | 9/2007 |

(56) References Cited

FOREIGN PATENT DOCUMENTS

| | | | |
|---|---|---|---|
| JP | 2007295363 | A | 11/2007 |
| JP | 2008148040 | A | 6/2008 |
| JP | 4246380 | B2 | 4/2009 |
| JP | 2009094582 | A | 4/2009 |
| JP | 4342754 | B2 | 10/2009 |
| JP | 2009273206 | A | 11/2009 |
| JP | 2010252289 | A | 11/2010 |
| JP | 2011120038 | A | 6/2011 |
| JP | 4735632 | B2 | 7/2011 |
| JP | 2011139396 | A | 7/2011 |
| JP | 2011163842 | A | 8/2011 |
| JP | 2011205577 | A | 10/2011 |
| JP | 5272254 | B2 | 8/2013 |
| KR | 894236 | B1 | 10/2007 |
| KR | 2009086145 | A | 8/2009 |
| KR | 937366 | B1 | 9/2009 |
| KR | 2009098170 | A | 9/2009 |
| KR | 2009098758 | A | 9/2009 |
| KR | 2011038657 | A | 4/2011 |
| KR | 1136426 | B1 | 11/2011 |
| KR | 2011128497 | A | 11/2011 |
| KR | 2012026160 | A | 3/2012 |
| TW | 200952553 | A | 12/2009 |
| WO | WO 9625796 | A1 | 8/1996 |
| WO | WO 0249203 | A2 | 6/2002 |
| WO | WO 2008100378 | A1 | 8/2008 |
| WO | WO 2009148789 | A1 | 12/2009 |
| WO | WO 2010134287 | A1 | 11/2010 |
| WO | WO 2013074845 | A2 | 5/2013 |
| WO | WO 2013126440 | A2 | 8/2013 |

\* cited by examiner

SYSTEM AND METHOD FOR CONTROLLING A POWER GENERATION SYSTEM BASED ON PLL ERRORS

FIELD OF THE INVENTION

The present subject matter relates generally to power generation systems and, more particularly, to a system and method for controlling aspects of the operation of a power convertor of a power generation system based on phase angle errors provided by a phase-locked loop (PLL) regulator.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

Typically, to allow for proper control of the power convertor, a phase-locked loop (PLL) circuit is used to closely track and maintain synchronization with the grid voltage. However, during certain grid and/or system events (e.g., a short circuit fault within the power generation system), significant and/or rapid changes may occur to the grid voltage, thereby causing the PLL to have a temporary loss in synchronization. While present control methodologies allow for power generation systems to ride through such events, the responsiveness of the PLL in regaining its synchronization with the grid voltage often takes longer than desired, which can result in undesirable system performance.

Accordingly, an improved system and method for controlling aspects of the operation of a power convertor of a power generation system that allow for a reduction in the amount of time required for the PLL to regain its synchronization with the grid voltage would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a power generation system. The method may generally include determining a phase angle error associated with tracking the power generation system, determining a scaling factor based on the phase angle error, generating a current command for controlling the operation of a power convertor of the power generation system and applying the scaling factor to the current command such that the current command is reduced when the phase angle error exceeds a predetermined error threshold.

In another aspect, the present subject matter is directed to a method for controlling a power generation system. The method may generally include determining a phase angle error associated with tracking the power generation system, determining a scaling factor based on the phase angle error, generating a proportional gain constant based on the scaling factor when the phase angle error exceeds a predetermined error threshold and utilizing the proportional gain constant within a phase-locked loop (PLL) regulator of the power generation system to generate a phase angle signal for synchronizing operation of the power generation system with an electrical grid.

In a further aspect, the present subject matter is directed to a wind turbine system including a generator, a power convertor coupled to the generator and a controller configured to control the operation of the power convertor. The controller may include instructions that, when implemented by one or more processors, configure the controller to determine a phase angle error associated with tracking the power generation system, determine a scaling factor based on the phase angle error, generate a current command for controlling the operation of the power convertor and apply the scaling factor to the current command such that the current command is reduced when the phase angle error exceeds a predetermined error threshold.

In yet another aspect, the present subject matter is directed to a wind turbine system including a generator, a power convertor coupled to the generator and a controller configured to control the operation of the power convertor. The controller may include instructions that, when implemented by one or more processors, configure the controller to determine a phase angle error associated with tracking the power generation system, determine a scaling factor based on the phase angle error, generate a proportional gain constant based on the scaling factor when the phase angle error exceeds a predetermined error threshold and utilize the proportional gain constant within a phase-locked loop (PLL) regulator to generate a phase angle signal for synchronizing the operation of the power generation system with an electrical grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the operation of a power generation system. Specifically, in several embodiments, the disclosed system and method provide a means for controlling aspects of the operation of a power convertor of the power generation system based on phase angle errors provided by a phase-locked loop (PLL) regulator. For example, as will be described below, a scaling factor may be calculated based on the phase angle error that may be applied in a manner that results in a reduction in the real and/or reactive current commands used to control the operation of the power convertor in response to a grid or system event resulting in a significant loss of PLL synchronization (i.e., when the phase angle error exceeds a predetermined error threshold). As a result of such reduced current commands, the electrical stresses on the system may be reduced, thereby allowing for the PLL regulator to regain its synchronization with the grid voltage in a much more efficient and timely manner.

In addition (or as an alternative thereto), the scaling factor determined based on the phase angle error may be used to dynamically calculate a proportional gain consent to be applied within the PLL regulator. Such use of the scaling factor may allow for a more aggressive proportional gain constant to be applied when the phase angle error increases beyond the predetermined error threshold, which may significantly reduce the amount of time required for the PLL regulator to regain its synchronization with the grid voltage.

In addition to reducing the amount of time required for the PLL regulator to regain its synchronization, use of the disclosed system and method may also provide for an overall increase in system stability. As a result, the present subject matter may facilitate improved operation during voltage ride-through events and/or any other suitable grid and/or system events.

It should be appreciated that, although the present subject matter will generally be described herein with respect to a wind turbine system, the disclosed system and method may generally be utilized within any suitable power generation system in order to facilitate reduced PLL synchronization times and/or improved system stability. For instance, as an alternative to a wind turbine system, the present subject matter may be implemented within a solar power system.

Figure 1:
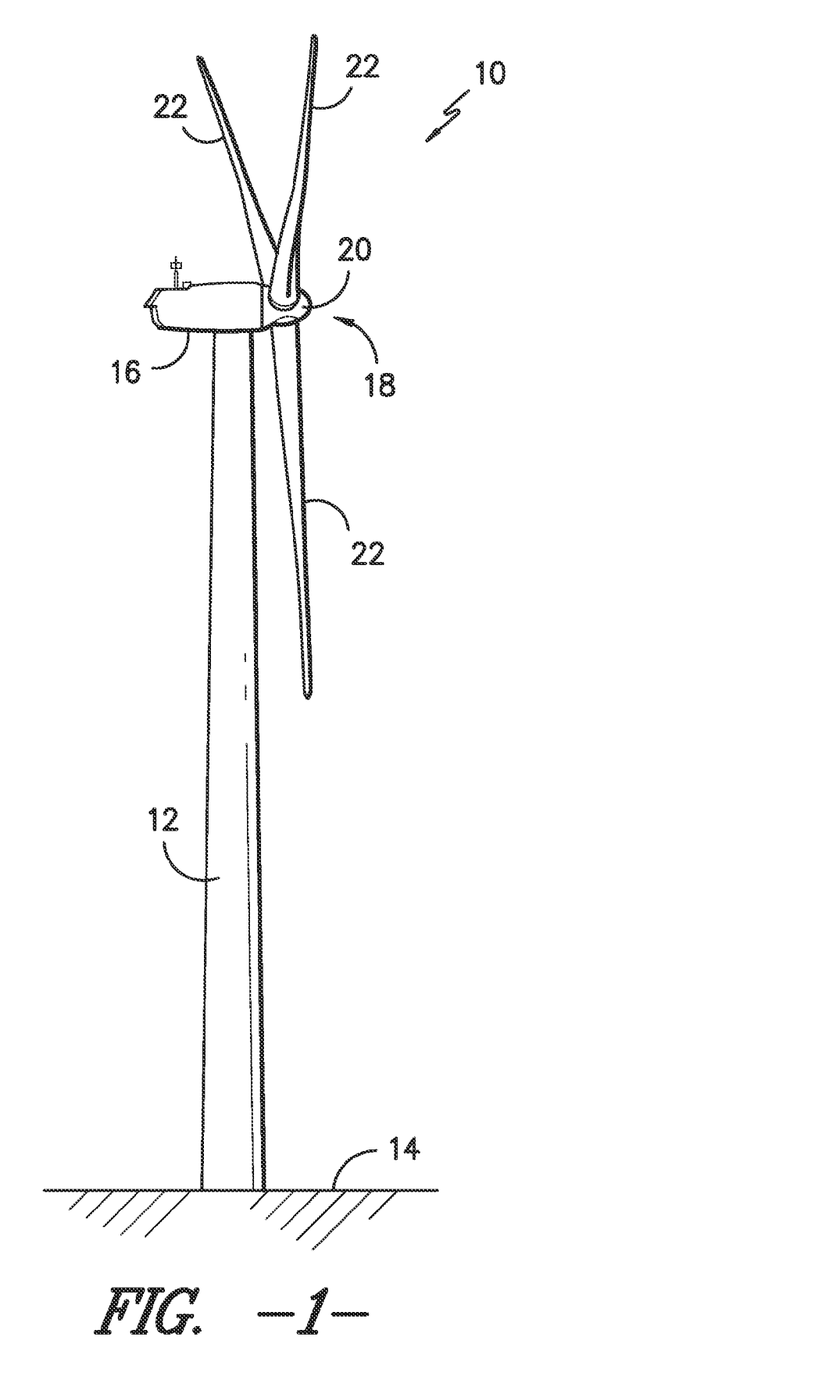
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Figure 2:
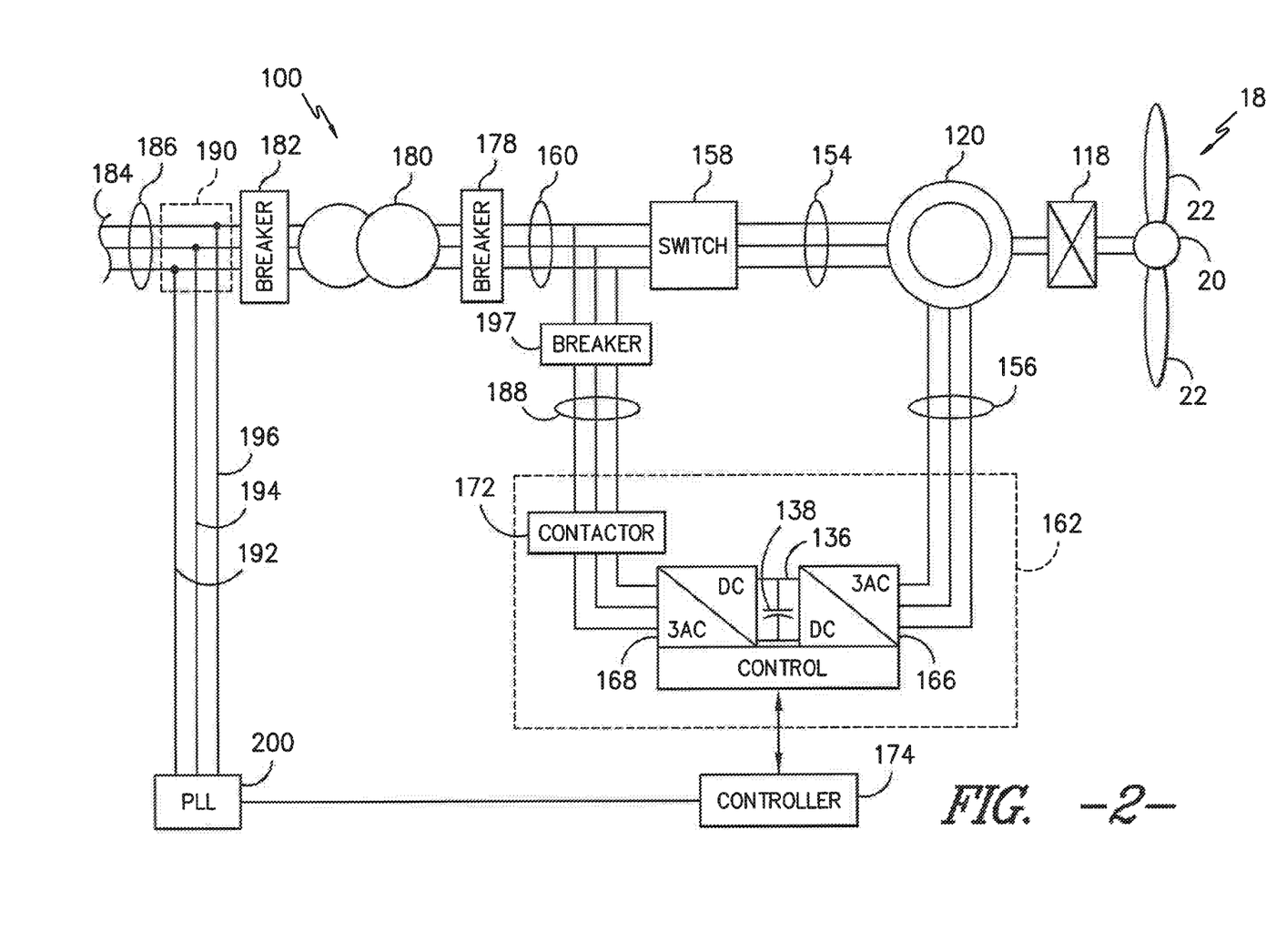
FIG. 2 illustrates a schematic diagram of one embodiment of a wind turbine system in accordance with aspects of the present subject matter.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In several embodiments, the generator 120 may be a doubly fed induction generator (DFIG). However, in other embodiments, the generator 120 may correspond to any other suitable type of generator.

The generator 120 may be coupled to a stator bus 154 and a power converter 162 via a rotor bus 156. The stator bus 154 may provide an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as insulated gate bipolar transistors (IGBTs) or any other suitable switching elements. The rotor side converter 166 and the line side converter 168 may be coupled via a DC link 136 across which is a DC link capacitor 138.

In addition, the power converter 162 may be coupled to a controller 174 configured to control the operation of the rotor side converter 166 and the line side converter 168. In general, the controller 174 may correspond to any suitable computing device and/or combination of computing devices. For instance, in several embodiments, the controller 174 may include one or more processor(s) and associated memory device(s configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions including, but not limited to, computer-implemented methods described herein.

In typical configurations, various line contactors and circuit breakers including, for example, a grid breaker 182 may also be included for isolating the various components as necessary for normal operation of the generator 120 during connection to and disconnection from the electrical grid 184. For example, a system circuit breaker 178 may couple the system bus 160 to a transformer 180, which may be coupled to a grid bus 186 via the grid breaker 182. In alternative embodiments, fuses may replace some or all of the circuit breakers.

In operation, alternating current power generated at the generator 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of generator 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 197, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For example, feedback in the form of a sensed speed of the generator 120 may be used to control the conversion of the output power from the rotor bus 156 to maintain a proper and balanced multi-phase (e.g. three-phase) power supply. In particular, the sensed speed may be used as a basis for adjusting the switching frequency of the switching elements. Additionally, feedback from other sensors may also be used by the controller 174 to control the power converter 162, including, for example, stator, rotor and/or grid bus voltages, voltages associated with the switching elements and current feedbacks. Using the various forms of feedback information, switching control signals (e.g. gating control commands for the switching elements), stator synchronizing control signals, circuit breaker signals and/or other suitable control commands/signals may be generated.

Additionally, in several embodiments, the controller 174 may also be configured to receive feedback from a phase lock loop (PLL) regulator 200. As is generally understood, the PLL regulator 200 may include or correspond to a closed looped circuit configured to detect phase information regarding a reference voltage (e.g., the grid voltage) and generate a resulting phase angle signal to be used by the controller 174 for controlling the operation of the power convertor 172 in a manner that synchronizes the converter's output voltage to the reference voltage. It should be appreciated that, although the PLL regulator 200 is illustrated herein as being separate from the controller 174, the PLL regulator 200 may be integrated into and/or form part of the controller 174. Alternatively, the PLL regulator 200 may be implemented on a separate computing device that is communicatively coupled to the controller 174.

In several embodiments, the PLL regulator 200 may be coupled to one or more voltage transduces 190 for receiving reference voltage measurements. For instance, as shown in FIG. 2, the PLL regulator 200 is coupled to three different voltage transducers 190 (e.g., via electrical conduits 192, 194, 196), with each voltage transducer 190 being coupled to one of the three phases of the grid bus 186. Alternatively, the PLL regulator 200 may be coupled to one or more voltage transducers configured to measure the voltage at any other suitable location within the system 100.

Figure 3:
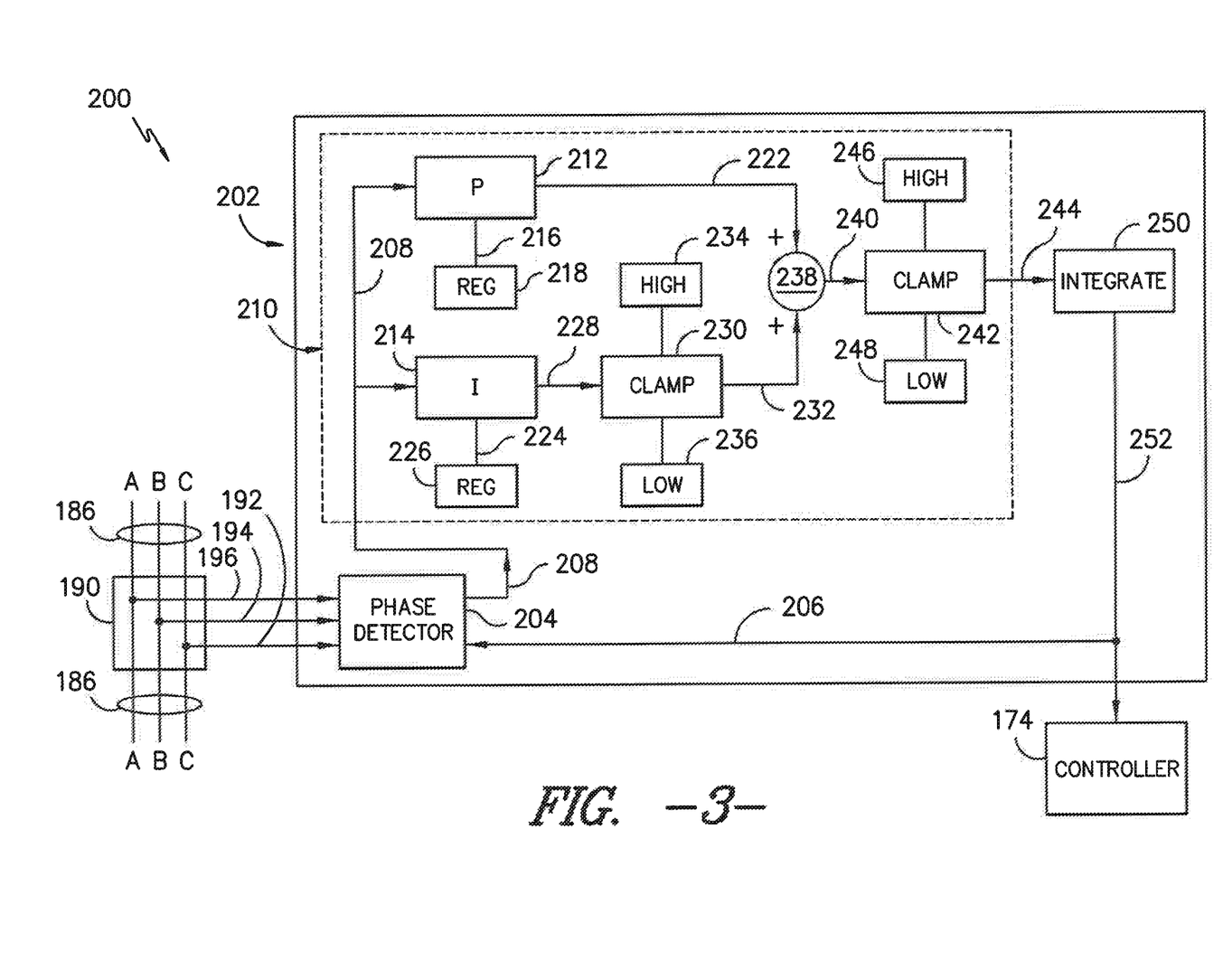
FIG. 3 illustrates a schematic diagram of one embodiment of a phase-locked loop (PLL) regulator suitable for use with the wind turbine system shown in FIG. 2.

Referring now to FIG. 3, a schematic diagram of one embodiment of a PLL regulator 200 suitable for use within the wind turbine system 100 shown in FIG. 2 is illustrated in accordance with aspects of the present subject matter. As indicated above, the PLL regulator 200 may be coupled to a plurality of voltage transducers 190 (e.g., via electrical conduits 192, 194, 196) for monitoring the grid voltage across phases A, B and C of the grid bus 186.

As shown in FIG. 3, the PLL regulator 200 may include at least one phase-locked loop (PLL) 202 corresponding to a closed-loop feedback scheme configured to maintain signals generated by the PLL regulator 200 in a fixed phase relationship with a reference signal. As is generally understood, the PLL-generated signal may be constantly adjusted to match, in phase, the frequency of the reference signal, i.e., the PLL "locks on" to the reference signal. In the illustrated embodiment, the PLL 202 is configured to lock on to the frequency of grid bus 186.

In general, the PLL 202 may include a phase detector function block 204 that is configured to receive sinusoidal voltage measurement signals transmitted from the voltage transducers 190 for the A-phase, B-phase and C-phase of the grid bus 186. As shown in FIG. 3, the phase detector 204 is also configured to receive a phase angle feedback signal 206 corresponding to an output signal of the PL 202L. The phase detector 204 may generally be configured to combine the voltage measurement signals with the feedback signal 206 to a generate phase error signal 208 (e.g., measured in radians (r)).

In addition, the PLL 202 may also include a proportional-integral (PI) filter 210. As shown, the PI filter 210 may generally include a proportional gain function block 212 and an integral gain function block 214, both of which are configured to receive the phase error signal 208 transmitted from the phase detector 204. The proportional gain function block 212 may also be configured to receive a proportional gain constant signal 216 from a proportional gain constant register 218. The register 218 may be populated with a plurality of proportional gain values to be applied based on the operating state of the disclosed system 100, including any dynamic proportional gain constants calculated in accordance with the disclosure provided herein. As is generally understood, the proportional gain function block 212 may be configured to multiply the phase error signal 208 by the gain constant signal 216 to generate a proportional gain signal 222 (e.g., measured in r/s). Similarly, in addition to the phase error signal 208, the integral gain function block 214 may be configured to receive an integral gain constant signal 224 from an integral gain constant register 226, which may be populated with a plurality of integral gain values to be applied based on the operating state of the disclosed system 100. As is generally understood, the integral gain function block 214 may be configured to integrate the phase error signal 208 with respect to time and multiply the integral value by the gain constant signal 224 to generate an integral gain signal 228 (e.g., measured in r/s).

The PI filter 210 may also include a first clamping function block 230 configured to receive the integral gain signal 228. In general, the first clamping function block 230 may correspond to a filter mechanism configured to evaluate the integral gain signal 228 based on a high frequency limit and a low frequency limit and generate a clamped integral gain signal 232 (e.g., measured in r/s) based on the such frequency limits. Specifically, if the integral gain signal 228 falls within the range defined between the high and low frequency limits, the resulting clamped integral gain signal 232 may correspond to the integral gain signal. However, if the integral gain signal 228 falls outside of the range defined by the high and low frequency limits, the resulting clamped integral gain signal 232 may correspond to the high frequency limit (e.g., if the integral gain signal 228 exceeds the high frequency limit) or the low frequency limit (e.g., if the integral gain signal 228 is lower than the low frequency limit). As shown in FIG. 3, the high and low frequency limits applied within the first clamping function block 230 may be transmitted to and populated within a high limit register 234 and a low limit register 236, respectively.

Additionally, the PI filter 210 may include a summation block 238 configured to sum the proportional gain signal 222 and the claimed integral gain signal 232 to generate a PI signal 240 (e.g., measure in r/s). Such signal 240 may then be transmitted to a second clamping function block 242. Similar to the first clamping function block 230, the second clamping function block 242 may generally correspond to a filter mechanism configured to evaluate the PI signal 240 based on a high frequency limit and a low frequency limit and generate a clamped PI signal 244 (e.g., measured in r/s) based on the such frequency limits. Specifically, if the PI signal 240 falls within the range defined between the high and low frequency limits, the resulting clamped PI signal 244 may correspond to the PI signal 240. However, if the PI signal 240 falls outside of the range defined by the high and low frequency limits, the resulting clamped PI signal 244 may correspond to the high frequency limit (e.g., if the PI signal 240 exceeds the high frequency limit) or the low frequency limit (e.g., if the PI signal 240 is lower than the low frequency limit). As shown in FIG. 3, the high and low frequency limits applied within the second clamping function block 242 may be transmitted to and populated within a high limit register 246 and a low limit register 248, respectively.

Moreover, the PLL 202 may also include an integrating function block 250 configured to configured to receive the clamped PI signal 244. In general, the integrating function block 240 may be configured to integrate the clamped PI signal 244 with respect to time in order to generate a phase angle signal 252 (e.g., measured in radians (r)). The phase angle signal 252 may then be transmitted to the controller 174 for use in controlling the power converter 162. Specifically, the controller 174 may be configured to use to the phase angle signal 252 to control the operation of the power convertor 162 in a manner that synchronizes the converter's output voltage with the measured grid voltage. As shown in FIG. 3, the phase angle signal 252 may also correspond to the phase angle feedback signal 206 transmitted to phase detector 204 in order to determine the phase error signal 208 as described above.

Figure 4:
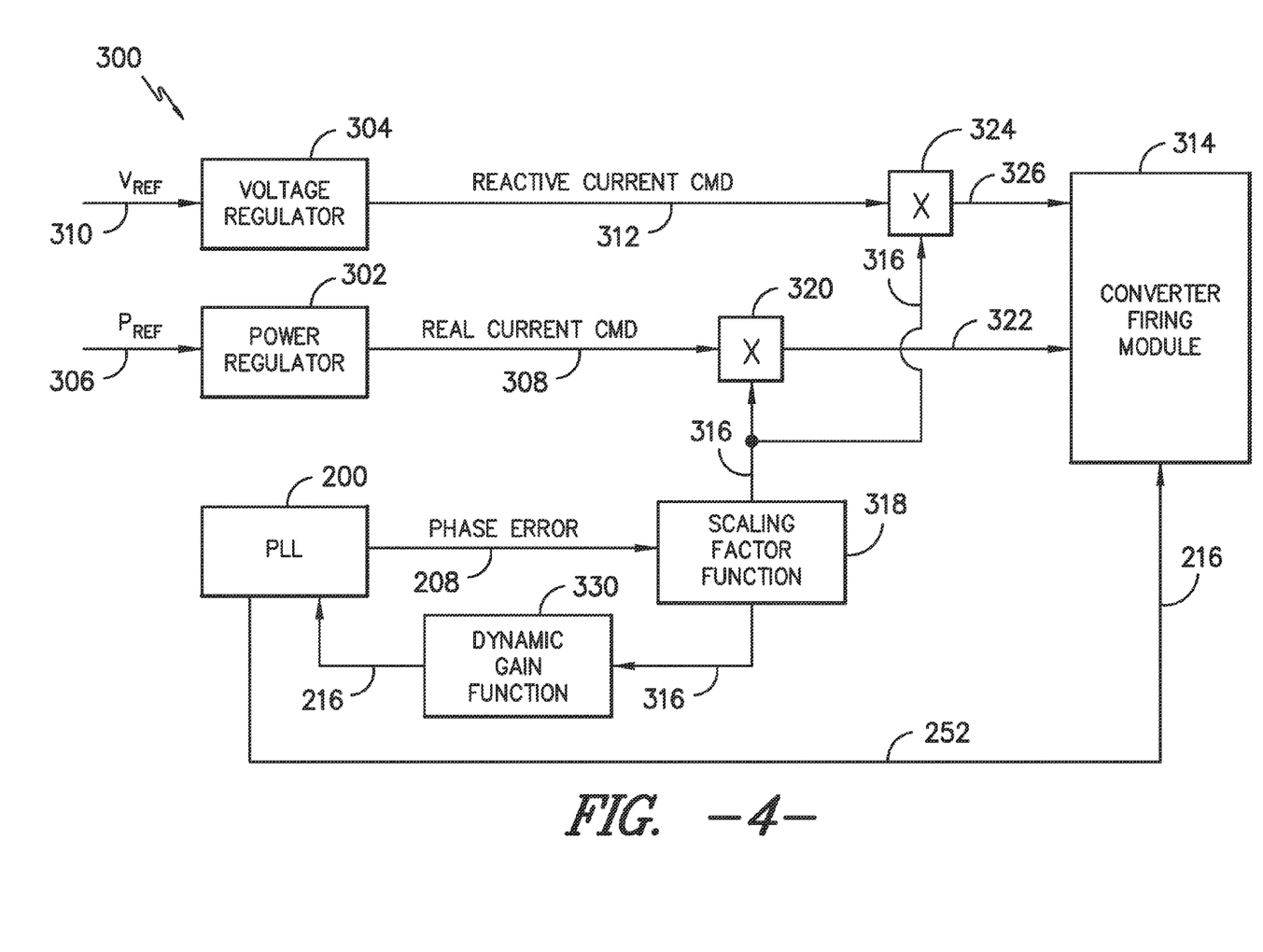
FIG. 4 illustrates a schematic diagram of one embodiment of a system for controlling a power generation system in accordance with aspects of the present subject matter.

Referring now to FIG. 4, a schematic view of one embodiment of a system 300 for controlling the operation of a power generation system is illustrated in accordance with aspects of the present subject matter. In several embodiments, the various system components shown in FIG. 4 may be implemented within the controller 174 described above. Alternatively, one or more of the system components may be implemented using a separate computing device that is communicatively coupled to the controller 174.

As shown, the system 300 may include both a power regulator 302 and a voltage regulator 304. The power regulator 302 may generally be configured to receive a reference power signal 306 (e.g., a reference value stored within the controller 174) and generate a real current command 308 based on the reference power signal 306. Additionally, the voltage regulator 304 may be configured to receive a reference voltage signal 310 (e.g., based on the voltage measurement signals provided by the voltage transducers 190 described above) and generate a reactive current command 312 based on the reference voltage signal 310. Typically, the real and reactive current commands 308, 312, together with the phase angle signal 252 generated by the PLL regulator 200, may be transmitted directly to a converter firing module 314 (e.g., a computer logic included within the controller 174 and/or any other suitable computing device) configured to control the operation of the power convertor 162. For example, in one embodiment, the converter firing module 314 may be configured to transmit suitable gating signals to one or more gate drivers for controlling the activation of the switching elements contained within the power converter 162. As such, based on the current commands 308, 312 and the phase angle signal 252, the converter firing module 314 may be configured to control the operation of the power convertor 162 in a manner consistent with the disclosure provided herein.

However, in accordance with aspects of the present subject matter, the disclosed system 300 may be configured to modify the current commands 308, 312 transmitted to the converter firing module 314 in the event of a system or grid event that results in a significant loss of synchronization with the grid voltage. Specifically, in several embodiments, a scaling factor 316 may be calculated based on the phase error signal 208 generated by the PLL regulator 200 that allows for the current commands 308, 312 to be reduced when the phase angle error exceed a predetermined error threshold. Such reduced current commands may allow for a reduction in the electrical stresses acting on the system, thereby allowing for the PLL regulator 200 to regain synchronization more quickly.

As shown in FIG. 4, the phase error signal 208 generated by the PLL regulator 208 may be input into a scaling factor function 318. In general, the scaling factor function 318 may correspond to any suitable transfer function or mathematical relationship that generates a scaling factor 316 based on the phase error signal 208. For example, as will be described below with reference to FIG. 5, the scaling factor function 318 may correspond to a mathematical relationship relating the cosine of the phase error signal 208 to a given scaling factor 316 such that the scaling factor 316 is equal to a value ranging from zero to one when the phase angle error is greater than the predetermined error threshold and is equal to one when the phase angle error is less than the predetermined error threshold.

As shown, the scaling factor 316 generated by the scaling factor function 318 may then be applied to real and reactive current commands 308, 312. Specifically, at multiplier block 320, the scaling factor 316 may be multiplied by the real current command 308 transmitted from the power regulator 302 to generate a scaled real current command 322. Similarly, at multiplier block 324, the scaling factor 316 may be multiplied by the reactive current command 312 transmitted from the voltage regulator 304 to generate a scaled reactive current command 326. The scaled real and reactive current commands 322, 326 may then be transmitted to the converter firing module 314 and subsequently used to control the operation of the power convertor 162.

It should be appreciated that, as an alternative to using the scaling factor 316 as a direct multiplier on the current commands 308, 312, the scaling factor 316 may instead be used to adjust any output limits associated with current commands 308, 312 output from the power regulator 302 and/or the voltage regulator 304. For instance, in one embodiment, a set of maximum and minimum current limits may be applied to the current commands 308, 312 output from each regulator 302, 304. In such an embodiment, the scaling factor 316 may be used as a multiplier for the maximum and minimum current limits in order to reduce the magnitude of the current commands 308, 312 when phase angle error exceeds the predetermined error threshold.

Figure 5:
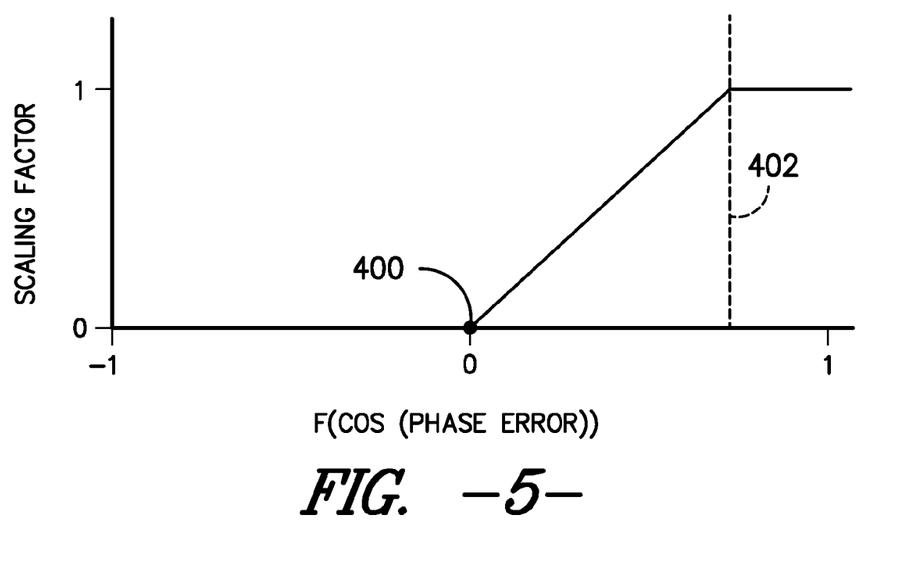
FIG. 5 illustrates a graphical representation of one example of a suitable function for correlating the phase angle error to a scaling factor in accordance with aspects of the present subject matter, particularly illustrating the cosine of the phase angle error charted along the x-axis and the scaling factor charted along the y-axis.

Referring now to FIG. 5, a graphic representational of one example of a suitable mathematical function that may be utilized as the scaling factor function 318 for determining the corresponding scaling factor 316 is illustrated in accordance with aspects of the present subject matter. Specifically, the graph charts the cosine of the phase angle error 208 output from the PLL regulator 200 along the x-axis and the scaling factor 316 along the y-axis. As indicated above, the mathematical function may generally be selected so that the scaling factor 316 corresponds to a value ranging from zero to one for any phase angle error exceeding the predetermined error threshold. For example, as shown in the illustrated embodiment, the mathematical function provides for a linear relationship between the cosine of the phase angle error 208 and the scaling factor 316 for all phase angle errors exceeding the predetermined error threshold such that the scaling factor 316 increases linearly from a value of zero at point 400 when the cosine of the phase angle error 208 is equal to zero (i.e., at a phase angle error of 90 degrees) to a value of one at threshold line 402 (with the threshold line 402 indicating the value of the cosine of the predetermined error threshold). Additionally, as shown, for phase angle errors ranging from 90 degrees to 180 degrees (i.e., at a cosine value of negative one), the scaling factor 316 is maintained at a value of zero. As such, with increases in the phase angle error 208 beyond the predetermined error threshold, the scaling factor 316 may be reduced so as to effectuate a suitable reduction in the real and reactive current commands 308, 312, thereby allowing for the PLL regulator 200 to more efficiently regain its synchronization with the grid voltage. However, as shown in FIG. 5, for all phase angle errors 208 less than the predetermined error threshold (i.e., x-axis values extending to the right of the threshold line 402), the scaling factor 316 may be equal to one such that the scaled current commands 322, 326 transmitted to the converter firing module 314 are equal to the real and reactive current commands 308, 312 initially generated by the power and voltage regulators 302, 304, respectively.

It should be appreciated that, in alternative embodiments, any other suitable mathematical relationship may be utilized to calculate the scaling factor 316 as a function of the phase angle error 208 provided by the PLL regulator 200. For instance, as opposed to the linear relationship shown in FIG. 5 between point 400 and threshold line 402, a non-linear relationship, such as a second, third or higher order polynomial, may be provided for calculating the scaling factor 316 associated with the phase angle errors falling between the maximum phase angle error and the predetermined error threshold.

It should also be appreciated that the predetermined error threshold may generally correspond to any suitable phase angle. However, in several embodiments, the predetermined error threshold may correspond to a phase angle ranging from about 30 degrees to about 60 degrees, such as from about 35 degrees to about 55 degrees or from about 40 degrees to about 50 degrees and any other subranges therebetween. For instance, in a particular embodiment of the present subject matter, the predetermined error threshold may correspond to a phase angle of 45 degrees. In such an embodiment, the threshold line 402 shown in FIG. 5 may generally correspond to a value of about 0.7 or 70%.

Referring back to FIG. 4, in addition to using the scaling factor 316 as a multiplier for the current commands 308, 312, or as an alternative thereto, the scaling factor 316 may be used to dynamically calculate a proportional gain constant for the PLL regulator 200. Specifically, as shown in FIG. 4, the scaling factor 316 generated by the scaling factor function 318 may be input into a dynamic gain function 330. In general, the dynamic gain function 330 may correspond to any suitable transfer function or mathematical relationship that generates a suitable proportional gain constant 216 based on the scaling factor 316. For example, as will be described below with reference to FIG. 6, the proportional gain function 330 may correspond to a mathematical relationship that allows for the proportional gain constant 216 utilized within the PLL regulator 200 (e.g., at function block 212 of FIG. 3) to be increased as the scaling factor 316 decreases. In other words, as the phase angle error 208 generated by the PLL regulator 200 increases, the proportional gain constant 216 may be similarly increased in a manner that results in more aggressive control of the operation of the power convertor 162, thereby providing a means for quickly resynchronizing the PLL regulator 200 with the grid voltage.

Figure 6:
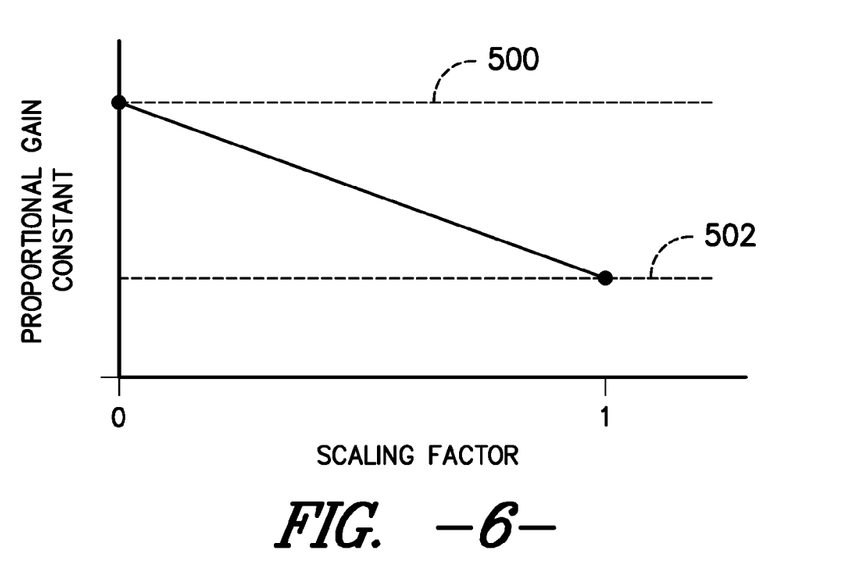
FIG. 6 illustrates a graphical representation of one example of a suitable function for correlating the scaling factor to a dynamic proportional gain constant in accordance with aspects of the present subject matter, particularly illustrating the scaling factor charted along the x-axis and the proportional gain constant charted along the y-axis.

Referring now to FIG. 6, a graphical representation of one example of a suitable mathematical function that may be utilized as the dynamic gain function 330 for dynamically determining a proportional gain constant 216 for the PLL regulator 200 based on the calculated scaling factor 316 is illustrated in accordance with aspects of the present subject matter. Specifically, the graph charts the scaling factor 316 along the x-axis and the corresponding proportional gain constant 216 along the y-axis. As indicated above, the mathematical function may generally be selected so that the proportional gain constant 216 increases as the phase angle error 208 increases (and, thus, as the scaling factor 316 decreases). For example, as shown in the illustrated embodiment, the mathematical function provides for a linear relationship between the scaling factor 316 and the corresponding proportional gain constant 216 such that the gain constant 216 decreases linearly from a first gain constant (indicated by line 500) at a scaling factor of zero to a second gain constant (indicated by line 502) at a scaling factor of one. In such an embodiment, the first gain constant 500 may correspond to an aggressive gain constant while the second gain constant 502 may correspond to a normal gain constant. As such, when the scaling factor 316 decreases with increases in the phase angle error 208, the proportional gain constant utilized within the PLL regulator 200 may become more aggressive to provide increased system responsiveness.

It should be appreciated that, in alternative embodiments, any other suitable mathematical relationship may be utilized to calculate the proportional gain constant 216 as a function of the phase angle error 208. For instance, as opposed to the linear relationship shown in FIG. 6 defined between the first and second gain constants 500, 502, a non-linear relationship, such as a second, third or higher order polynomial) may be defined between such gain constants 500, 502 to adjust the manner in which the gain constant 216 varies with changes in value of the scaling factor 316.

Figure 7:
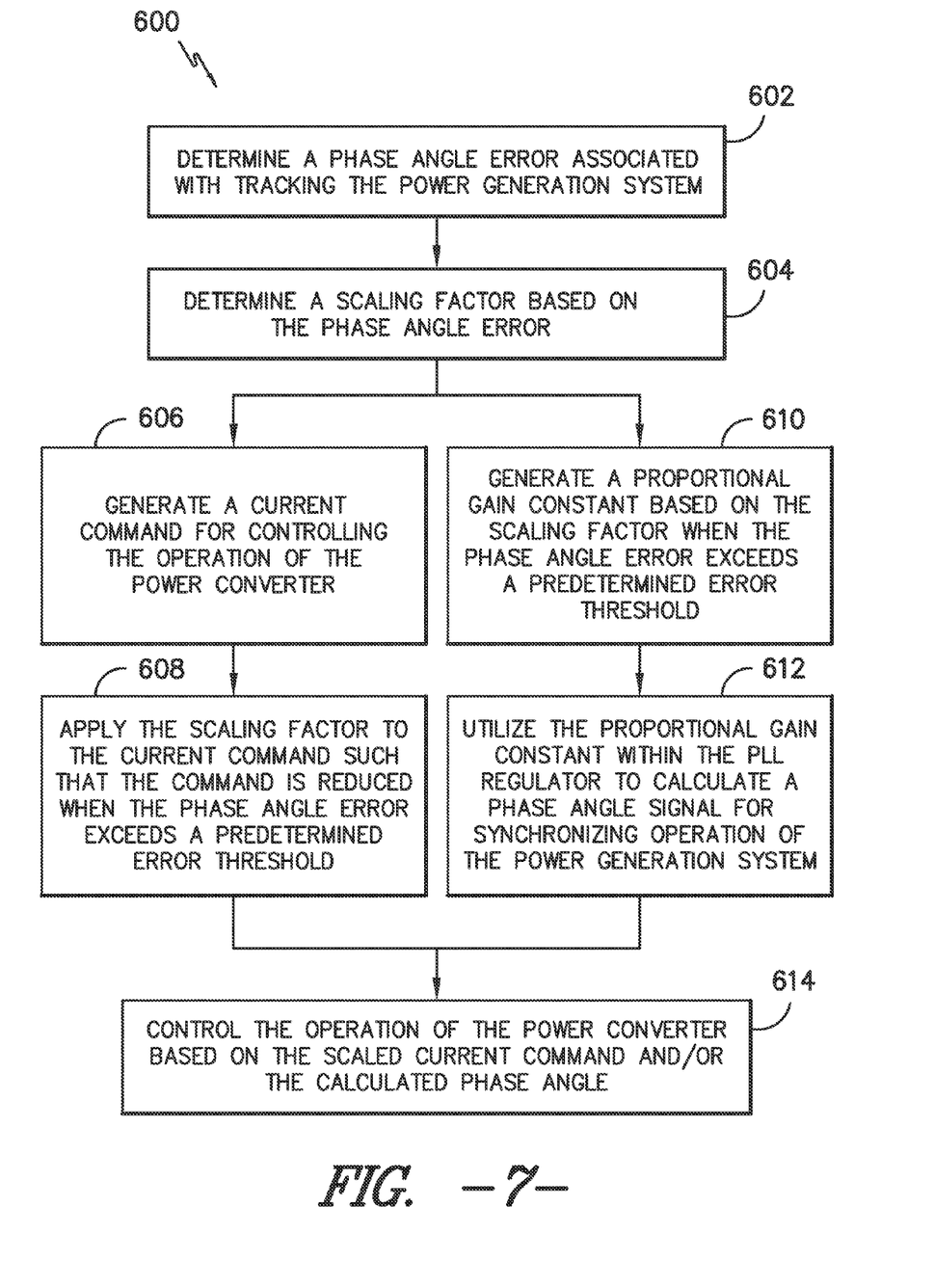
FIG. 7 illustrates a flow diagram of one embodiment of a method for controlling a power generation system in accordance with aspects of the present subject matter.

Referring now to FIG. 7, one embodiment of a method 600 for controlling the operation of a power generation system is illustrated in accordance with aspects of the present subject matter. In general, the method 600 will be described herein as being implemented using a wind turbine system, such as the wind turbine system 100 described above with reference to FIGS. 2-4. However, it should be appreciated that the disclosed method 600 may be implemented using any other suitable power generation system that is configured to supply power for application to a load. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 7, at (602), the method 600 includes determining a phase angle error associated with tracking the power generation system. Specifically, in several embodiments, the phase angle error may be monitored using a PLL regulator of the power generation system. For example, as indicated above with reference to FIG. 3, by receiving one or more voltage measurement signals associated with the grid voltage, a phase detector 204 of the PLL regulator 200 may be configured to calculate the instantaneous phase angle error 208 based on the phase angle feedback signal 206 provided via the closed-loop configuration of the corresponding PLL 202.

Additionally, at (604), the method 600 includes determining a scaling factor based on the phase angle error. Specifically, as indicated above, a suitable mathematical relationship may be developed that correlates the calculated phase angle error 208 to a given scaling factor 316. For example, in several embodiments, the mathematical relationship may be selected such that the scaling factor 316 decreases from a value of one towards a value of zero as the phase angle error 208 increases beyond a predetermined error threshold.

As described above, when the phase angle error 208 exceeds the predetermined error threshold, the calculated scaling factor 316 may be used to modify the current commands 308, 312 used to control the power convertor 162. For example, as shown in FIG. 7, at (606 and 608), the method 600 may include generating a current command for controlling the operation of the power convertor and applying the scaling factor to the current command such that the current command is reduced when the phase angle error exceeds the predetermined error threshold. Specifically, as indicated above, a power regulator 302 and a voltage regulator 304 of the power generation system 100 may be configured to generate real and reactive current commands 308, 312, respectively, for controlling the operation of the power convertor 162. The scaling factor 316 may then be applied to the current commands 308, 312 in a manner that results in a reduction of such commands when the phase angle error 208 exceeds the predetermined error threshold. For example, as shown in FIGS. 4 and 5, the scaling factor 316 may correspond to a multiplier for the current commands 308, 312 and may be reduced from a value of one as a function of the amount that the phase angle error 208 exceeds the predetermined error threshold, thereby providing for a reduction in the current commands in the event of excessive phase angle errors 208. In addition, the scaling factor 316 may also be configured to be applied to the current commands 308, 312 in a manner maintains such current commands "as is" when the phase angle error 208 is less than the predetermined error threshold (e.g., by setting the scaling factor to a value of one).

Moreover, the scaling factor may also be used to calculate a dynamic proportional gain constant for the PLL regulator. For example, as shown in FIG. 7, at (610 and 612), the method 600 may include generating a proportional gain constant based on the scaling factor when the phase angle error exceeds a predetermined error threshold and utilizing the proportional gain constant within the PLL regulator to calculate a phase angle signal for synchronizing the operation of the power generation system. Specifically, as indicated above, a suitable mathematical relationship may be developed that correlates the scaling factor 316 to a corresponding proportional gain constant 216. For example, in several embodiments, the mathematical relationship may be selected such that the proportional gain constant 216 become more aggressive as the scaling factor 316 decreases (and, thus, as the phase angle error 208 increases). The resulting gain constant 216 may then be applied within the PLL regulator 200 to allow for the generation a phase angle signal 252 for synchronizing the operation of the power generation system 100 with the grid voltage.

Referring still to FIG. 7, at (614), the method 600 includes controlling the operation of the power convertor of the power generation system based on the scaled current commands derived from method elements 606 and 608 and/or the calculated phase angle signal derived from method elements 610 and 612. As indicated above, the scaled current commands 322, 326 and the phase angle signal 252 determined using the dynamically calculated proportional gain constant may be used in combination or as a separate means for increasing the effectiveness of the PLL regulator 200 in regaining its synchronization with the grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power generation system, the method comprising:
   determining, with a computing device, a phase angle error associated with tracking the power generation system based on measurement signals received from one or more voltage transducers;
   determining, with the computing device, a scaling factor based on the phase angle error, the scaling factor corresponding to a value ranging from zero to one when the phase angle error exceeds the predetermined error threshold and a value of one for all phase angle errors below the predetermined error threshold;
   generating, with the computing device, a current command for controlling the operation of a power convertor of the power generation system; and
   applying, with the computing device, the scaling factor to the current command such that the current command is reduced when the phase angle error exceeds a predetermined error threshold.

2. The method of claim 1, wherein the scaling factor is defined as a function of a cosine of the phase angle error.

3. The method of claim 1, wherein the predetermined error threshold corresponds to an angle ranging from about 30 degrees to about 60 degrees.

4. The method of claim 1, wherein generating the current command comprises mnerating a real current command and a reactive current command for controlling the operation of the power convertor.

5. The method of claim 4, wherein applying the scaling factor to the current command comprises applying the scaling factor as a multiplier to the real current command and the reactive current command such that both current commands are reduced when the phase angle error exceeds the predetermined error threshold.

6. The method of claim 1, further comprising controlling the operation of the power convertor based on the scaled current command.

7. The method of claim 1, further comprising:
   generating a proportional gain constant based on the scaling factor when the phase angle error exceeds the predetermined error threshold; and
   utilizing the proportional gain constant within a phase-locked loop (PLL) regulator of the power generation system to generate a phase angle signal for synchronizing operation of the power generation system with an electrical grid.

8. The method of claim 1, wherein the power generation system comprises a wind turbine system.

9. A method for controlling a power generation system, the method comprising:
   determining, with a computing device, a phase angle error associated with tracking the power generation system based on measurement signals received from one or more voltage transducers;
   determining, with the computing device, a scaling factor based on the phase angle error;
   generating, with the computing device, a proportional gain constant based on the scaling factor when the phase angle error exceeds a predetermined error threshold; and
   inputting, with the computing device, the proportional gain constant into a phase-locked loop (PLL) regulator of the power generation system to generate an output from the PLL regulator corresponding to a phase angle signal for synchronizing operation of the power generation system with an electrical grid,
   wherein the scaling factor decreases as the phase angle error is increased beyond the predetermined error threshold and the proportional gain constant is configured to increase with decreases in the scaling factor.

10. The method of claim 9, wherein the scaling factor is defined as a function of a cosine of the phase angle error.

11. The method of claim 9, wherein the predetermined error threshold corresponds to an angle ranging from about 30 degrees to about 60 degrees.

12. The method of claim 9, further comprising controlling the operation of a power convertor of the power generation system based on the phase angle signal.

13. The method of claim 9, further comprising:
   generating a current command for controlling the operation of a power convertor of the power generation system; and
   applying the scaling factor to the current command such that the current command is reduced when the phase angle error exceeds the predetermined error threshold.

14. The method of claim 9, wherein the power generation system comprises a wind turbine system.

15. A wind turbine system, comprising:
   a generator;
   a power convertor coupled to the generator; and
   a controller configured to control the operation of the power convertor, the controller including instructions that, when implemented by one or more processors, configure the controller to:
      determine a phase angle error associated with tracking the power generation system based on measurement signals received from one or more voltage transducers;
      determine a scaling factor based on the phase angle error, the scaling factor corresponding to a value ranging from zero to one when the phase angle error exceeds the predetermined error threshold and a value of one for all phase angle errors below the predetermined error threshold;
      generate a current command for controlling the operation of the power convertor; and
      apply the scaling factor to the current command such that the current command is reduced when the phase angle error exceeds a predetermined error threshold.

16. The wind turbine system of claim 15, wherein the controller is further configured to generate a proportional gain constant based on the scaling factor when the phase angle error exceeds the predetermined error threshold and utilize the proportional gain constant within a phase-locked loop (PLL) regulator to generate a phase angle signal for synchronizing the operation of the power generation system with an electrical grid.

17. The wind turbine system of claim 15, wherein the generator corresponds to a doubly-fed induction generator.

* * * * *